United States Patent Office 3,714,369
Patented Jan. 30, 1973

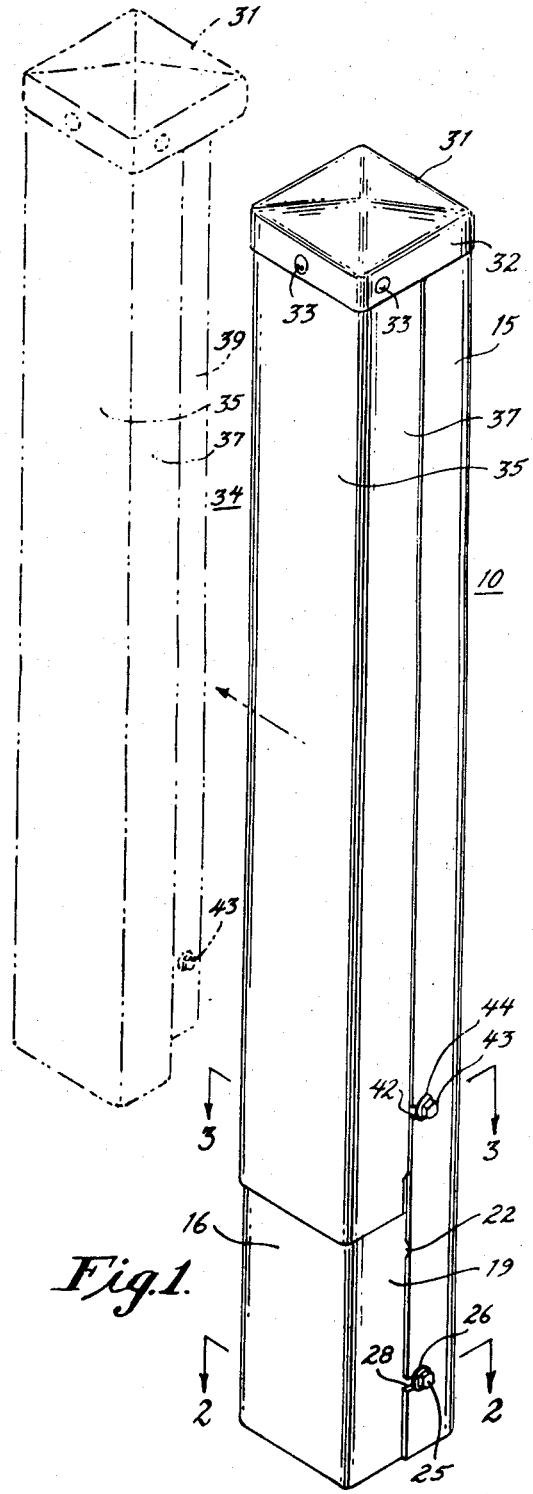

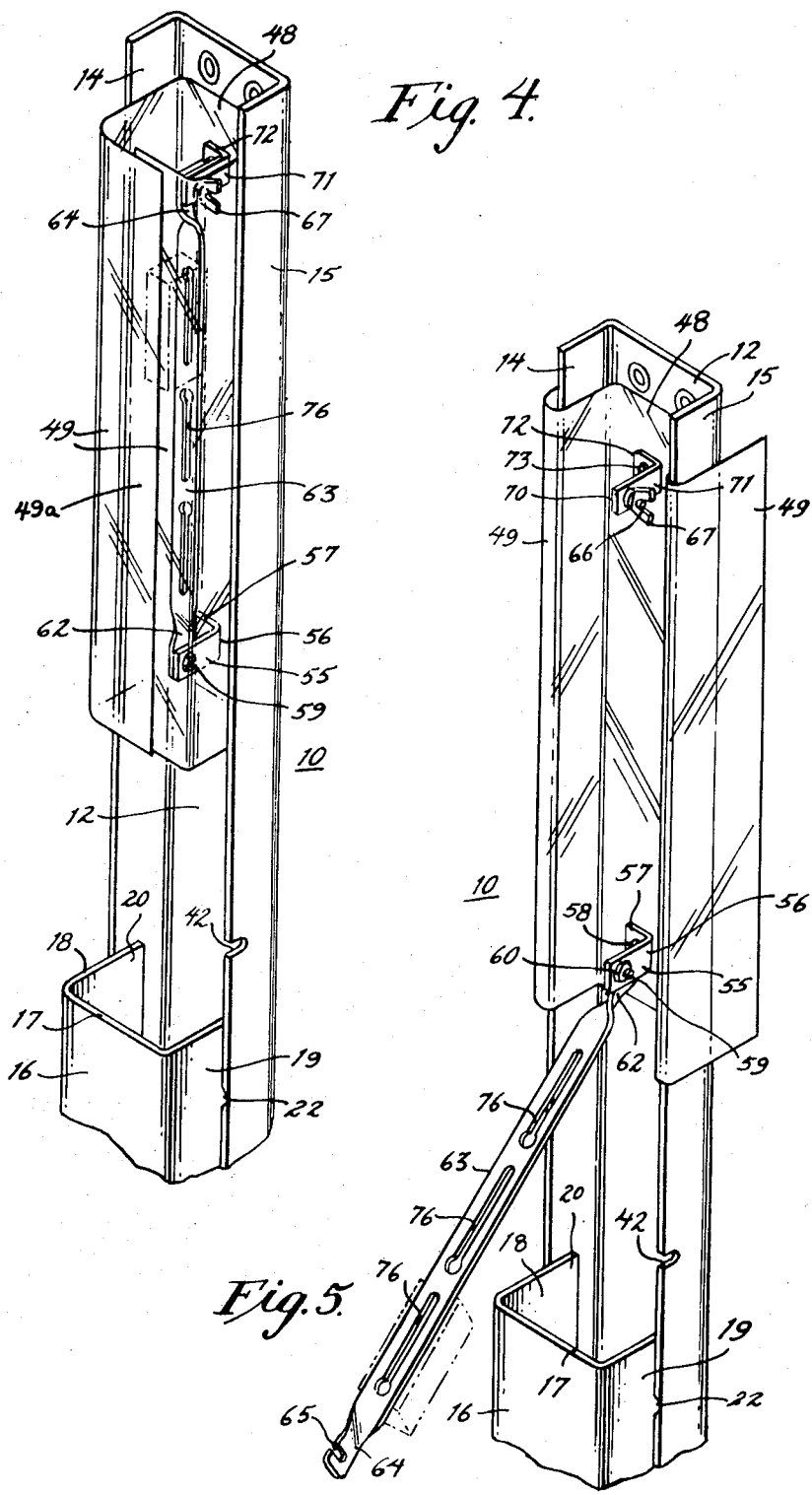

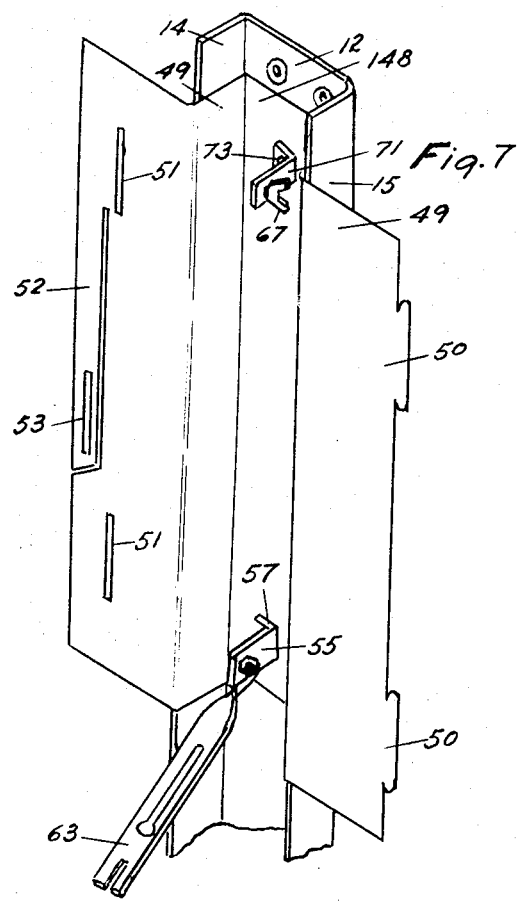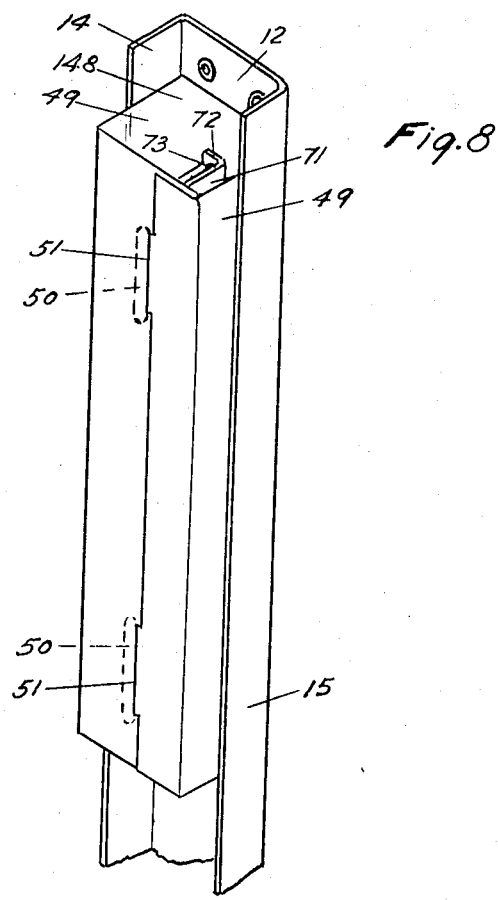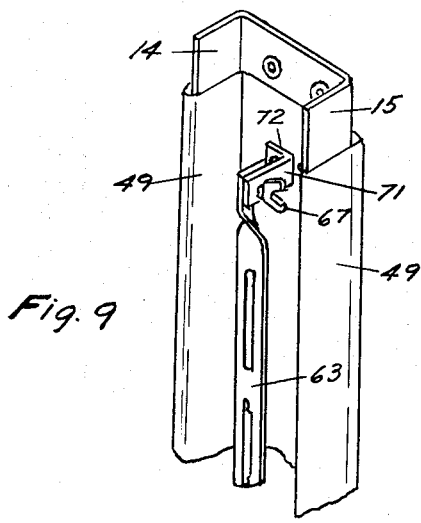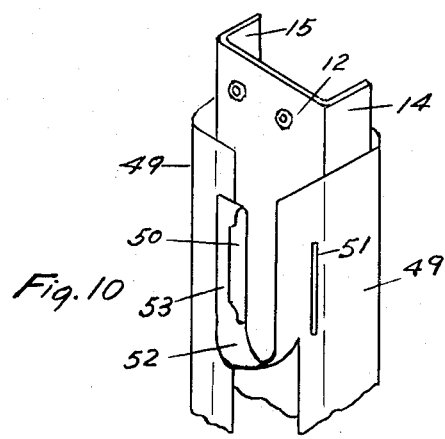

3,714,369
PEDESTAL FOR ELECTRICAL CIRCUIT COMPONENTS HAVING A FLEXIBLE PROTECTIVE DIELECTRIC SHIELD
Theodore M. Bunten, Rydal, Pa., assignor to Repco Products Corporation, Philadelphia, Pa.
Continuation-in-part of application Ser. No. 192,253, Oct. 26, 1971. This application Dec. 28, 1971, Ser. No. 212,942
Int. Cl. H02g 9/00
U.S. Cl. 174—38                                                5 Claims

ABSTRACT OF THE DISCLOSURE

A hollow vertical pedestal or terminal housing is disclosed having a bottom section for support and cable entrance, and an upper section, the front and top being removable for access to the interior into which cables and the like to be connected are terminated, the upper section at the back being provided with brackets for attachment of electrical circuit components and a protective shield of flexible dielectric material being provided to enclose the circuit components and provide a dielectric shield, a dust shield and a snow and weather shield.

CROSS REFERENCE TO RELATED APPLICATION

This application is a continuation in part of my prior application for Pedestals for Electrical Circuit Components filed Oct. 26, 1971, Ser. No. 192,253.

BACKGROUND OF THE INVENTION

Field of the invention

This invention relates to hollow vertical pedestals extending above ground for the connection of cable terminals and the interposition of electrical circuit components and more particularly to provisions for protecting the components and their electrical connections.

DESCRIPTION OF THE PRIOR ART

It has heretofore been proposed to provide pedestals and other receptacles below and above ground for the connection of the terminal ends of meeting cables and electrical conductors. In association with the vertical pedestals heretofore available, interior brackets and the like have been utilized to mount electrical circuit components and to facilitate the connection of the cable wires.

The components and their terminal end connections have been left exposed in the interior of the receptacle.

SUMMARY OF THE INVENTION

In accordance with the invention a hollow pedestal or terminal housing is provided, preferably of sheet metal, for the connection in the interior of the terminal ends of electrical cables, electrical conductors and the like, with or without interposed electric circuit components, which includes an outer upright lower section which can extend below the surface of the earth and an upper section having a fixed back and forwardly extending side portions and a removable front and top closure portion, the back portion having brackets or the like for electric circuit components which is readily accessible when the front and top closure is removed, the back or side portions having disposed therealong a dielectric shield which extends forwardly on both sides and then in overlapped relation at the front. The overlapped portions can also be secured together, and an auxiliary holding strap may also be provided to hold the front portions in a position to permit complete access to the interior for making the necessary installation and connection of components and electrical terminals.

It is the principal object of the present invention to provide a hollow pedestal, a part of which is exposed and a part of which is mounted in the earth, for accommodation of and protection of the ends of underground cables extending thereto, for the easy mounting of electrical circuit components in the interior thereof and with added protection of the circuit components and the electrical terminal connections.

It is a further object of the present invention to provide a pedestal assembly of the character aforesaid which is self-contained and ready for use.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a view in perspective of the pedestal in accordance with the invention, the removal of the top and front cover being shown in phantom;

FIG. 2 is a horizontal sectional view, enlarged, taken approximately on the line 2—2 of FIG. 1;

FIG. 3 is a horizontal sectional view taken approximately on the line 3—3 of FIG. 1;

FIG. 4 is a fragmentary perspective view of the upper part of the pedestal with the top and front cover removed and with the interior shield in a protective position;

FIG. 5 is a view similar to FIG. 4 but showing the bracket swung outwardly for component attachment and showing the shield in a position for access to the interior;

FIG. 6 is a front elevational view, enlarged, of the bracket in place;

FIG. 7 is a view similar to FIG. 5 showing another form of protective shield in open position for access to the interior;

FIG. 8 is a view similar to FIG. 4 and showing the shield in secured protective position;

FIG. 9 is a fragmentary perspective view as seen from the front showing the shield secured in open position for access; and FIG. 10 is a fragmentary perspective view similar to FIG. 9 as seen from the rear and showing the securement of the shield in open position.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, in the preferred embodiment illustrated, the vertical pedestal or terminal housing, shown generally at 10, preferably of rectangular tubular shape and of sheet metal of suitable gauge, has a flat vertical rear wall 12 extending the height of the pedestal 10 with vertical parallel side walls 14 and 15 extending forwardly therefrom. The rear wall 12 and side walls 14 and 15 in horizontal cross section are of channel shape.

A flat vertical lower front wall 16 is provided having an upper terminal edge 17 and lower vertical parallel side walls 18 and 19 extending rearwardly therefrom.

The lower front wall 16 and side walls 18 and 19, in horizontal cross section, are preferably of channel shape and have rims 20 and 21 extending inwardly in overlapping relation to the side walls 14 and 15 and a struck-in positioning tongue 22 shown on the wall 18 in FIG. 2 and on the wall 19 in FIGS. 1, 4 and 5.

The lower front unit consisting of the lower front wall 16 and lower side walls 18 and 19 is held in assembled relation to the unit consisting of the rear wall 12 and side walls 14 and 15 by one or more bolts 25 having integral washers 26 on their heads. The bolts 25 engage nuts 27 affixed to the inner faces of the rims 20 and 21. The bolts 25 are preferably held in any desired manner against separation from the nuts 27. Slots 28 in the walls 18 and 19 permit of easy assembly of the lower front unit and securing the same in place.

The pedestal 10 may be anchored at the bottom to an anchor post (not shown) at or below ground level or the pedestal 10 may have the rear wall 12 thereof secured to a vertical pole (not shown) or to a building (not shown) by suitable fasteners extending therethrough.

The pedestal 10, for specific uses, has a height of the order of thirty five inches and transversely can range from about three and one half inches by three and one half inches to about nine inches by nine inches.

A top and upper front closure is provided, preferably made of two pieces, and including a rectangular inverted dish shaped cap 31 with a downwardly extending rim 32 in overlapping relation to the top of the rear wall 12 and the upper side walls 14 and 15.

Secured to the rim 32, such as by rivets 33, a front and side closure 34, channel shaped in horizontal cross section, has a flat vertical front wall 35 and parallel vertical side walls 36 and 37 with inset rims 38 and 39 to be disposed inwardly along and in overlapped relation to the side walls 14 and 15.

The front wall 35 preferably extends downwardly outside the lower front wall 16 in overlapping relation thereto and the side walls 36 and 37 extend downwardly in overlapping relation to the side walls 18 and 19.

The side wall 15, at the lower portion thereof, has a horizontal slot 42 for the reception of the shank of a bolt 43. The bolt 43 has an integral washer 44 on its head and is engaged in a nut 45 which is secured to the inner face of the wall 15 and the bolt 43 is preferably held in any desired manner against separation from the nut 45.

A sheet 48 of flexible dielectric material is provided and secured to the upper portion of the pedestal in the interior, and advantageously can be secured to the inner face of rear wall 12 so that it extends downwardly to a location spaced above the level of the upper edge 17. The sheet 48 has side wing portions 49 to extend forwardly and across the front, rearwardly of the front wall 35, in overlapping relation as at 49a and in protecting relation to components mounted in the interior. The sheet 48 is preferably of low density polyethylene.

The sheet 48 is shown in FIG. 4 in a protective position and in FIG. 5 in an opened position for access to the interior of the upper end of the pedestal for installation and connection of components and cable terminals.

The rear wall 12 may have secured thereto, if desired, cable ties, cable tie supports, and retainer clips (not shown) of well known type.

The rear wall 12 for purposes of illustration is shown as having a mounting bracket assembly secured thereto. The mounting bracket assembly has a lower hinge clip 56 with a vertical rear portion 57 secured to the rear wall 12 such as by a rivet 58 extending through the sheet 48. The clip 56 has a vertical forwardly extending portion 55 for the reception of a horizontal bolt 59 with a nut 60 thereon which provides a hinge pin or fulcrum for the lower end 62 of a bracket 63. The bracket 63 extends from the lower end 62 in a vertical plane perpendicular to the vertical plane of the lower end 62. The bracket 63 has an upper end 64 in a vertical plane parallel to the plane of the lower end 62. The upper end 64 of the bracket 63 has a rearwardly extending slot 65 for engagement of the upper end 64 on a bolt 66. The bolt 66 has a wing nut 67 thereon for manual manipulation and held against separation from the bolt 66 in any desired manner.

The bolt 66 is carried on the forwardly extending portion 70 of an upper mounting clip 71. The clip 71 has a rear portion 72 which is secured to the rear wall 12 through the sheet 48 in any desired manner such as by a bolt 73.

The bracket 63 is an elongated strip, preferably of metal, but which may be of synthetic plastic material of adequate strength.

The bracket 63 is illustrated as having elongated keyhole slots 76 therealong.

The lower clip 56 may, if desired, have a ground connector 78 (see FIG. 6) secured thereto for grounding of desired circuit components. Any other brackets or supporting elements could be used if desired.

Referring now to FIGS. 7 and 8, another form of protective shield 148 is there shown, secured as before to the interior of the pedestal at its upper end and with side wing portions 49.

The shield 148, along one side margin, is provided with upper and lower tongues 50 which detachably engage in slots or openings 51 inwardly of the other side margin.

If desired, a holding strap 52 can be provided along one margin of the shield 148 with a slot 53 near one end thereof.

With the wing portions 49 disposed forwardly along the interior of the side walls 14 and 15 and then rearwardly along the exteriors of the side walls 14 and 15 and then along the rear of the real wall 12, strap 52 can be utilized in engagement at the slot 53 with the upper tongue 50 to hold the shield 148 in an open position for access to the interior. The strap 52 can be released when desired and the shield 148 secured in closed position as shown in FIG. 8.

The pedestal 10 as herein disclosed is particularly suited for receiving the terminal ends of cables (not shown) which extend upwardly from the bottom or enter from the top through a weathertight fitting for the interconnection into the circuitry of loading coil, terminal blocks both protected and unprotected and other instrumentation including built-out capacitors, lattice networks, saturable inductors, junction impedence compensators, gas tube protectors and others.

The cable ties and cable tie supports can be utilized for the cables while the retainer clips and the bracket 63 can be utilized for mounting of the desired components. Access to the bracket 63 for attachment of components can be readily effected by positioning the wings 49 in open positions.

The top and front closure can be removed if desired by loosening the bolt 43, swinging the lower part of the front wall 35 forwardly so that the slot 42 is clear of the bolt 43 and then raising the top and front closure.

With the cable terminals connected as desired and with the desired circuit components in place the top and front closure can be assembled in place and secured by a reversal of the steps previously described.

The shields 48 and 148 provide a dielectric shield to hold the wires within the pedestal and prevent pinching of the wires. The shields 48 and 148 also serve as dust shields and as snow and weather shields for the components mounted in the pedestal and the terminal wire connectors.

The structure heretofore described is substantially weathertight and any water which might enter along the side walls would tend to drain downwardly for discharge without adversely affecting either the cables, the terminals or their conductors or the circuit components mounted within the pedestal 10, with added protection afforded by the shields 48 or 148.

What is claimed is:

1. A terminal housing for electrical equipment comprising:

a housing portion having a vertically elongated rear wall and side walls extending forwardly therefrom, a detachable closure means for the top and front of said housing portion including a cap extending over and downwardly along said rear and side walls, and a vertically elongated front wall extending downwardly from said cap with side walls extending therefrom in overlapping relation to the first mentioned side walls, and a dielectric shield disposed along the interior of the rear wall and said first mentioned side walls and having forwardly extending wings with portions in overlapped relation, said wings being provided with members for securing said overlapped portions in engagement.

2. A terminal housing as defined in claim 1 in which said members for securing comprise interengaging portions of said shield.

3. A terminal housing as defined in claim 1 in which said members for securing comprise tongues on said shield engageable in openings in said shield.

4. A terminal housing for electrical equipment comprising:

a housing portion having a vertically elongated rear wall and side walls extending forwardly therefrom, a detachable closure means for the top and front of said housing portion including a cap extending over and downwardly along said rear and side walls, and a vertically elongated front wall extending downwardly from said cap with side walls extending therefrom in overlapping relation to the first mentioned side walls, and a dielectric shield disposed along the interior of the rear wall and said first mentioned side walls and having forwardly extending wings with portions in overlapped relation, said shield having a member thereon for holding said shield in an open position.

5. A terminal housing for electrical equipment comprising:

a housing portion having a vertically elongated rear wall and side walls extending forwardly therefrom, a detachable closure means for the top and front of said housing portion including a cap extending over and downwardly along said rear and side walls, and a vertically elongated front wall extending downwardly from said cap with side walls extending therefrom in overlapping relation to the first mentioned side walls, and a dielectric shield disposed along the interior of the rear wall and said first mentioned side walls and having forwardly extending wings with portions in overlapped relation, said shield having a strap thereon extending from one side margin and engageable with a portion at the other side margin for holding said shield in an open position.

References Cited

UNITED STATES PATENTS

| | | | |
|---|---|---|---|
| 3,153,116 | 10/1964 | Phillips | 174—38 |
| 3,404,212 | 10/1968 | Mack et al. | 174—38 |
| 3,604,835 | 9/1971 | Hamilton | 174—38 |

LARAMIE E. ASKIN, Primary Examiner

U.S. Cl. X.R.

317—120